United States Patent
Amouie et al.

(10) Patent No.: US 11,507,779 B1
(45) Date of Patent: Nov. 22, 2022

(54) TWO-STAGE DEEP LEARNING FRAMEWORK FOR DETECTING THE CONDITION OF RAIL CAR COUPLER SYSTEMS

(71) Applicant: NORFOLK SOUTHERN CORPORATION, Atlanta, GA (US)

(72) Inventors: Mahbod Amouie, Atlanta, GA (US); Gongli Duan, Snellville, GA (US); Wei Liu, Syracuse, NY (US); Ilya A. Lavrik, Atlanta, GA (US)

(73) Assignee: Norfolk Southern Corporation, Atlanta, GA (US)

( * ) Notice: Subject to any disclaimer, the term of this patent is extended or adjusted under 35 U.S.C. 154(b) by 32 days.

(21) Appl. No.: 16/938,102

(22) Filed: Jul. 24, 2020

(51) Int. Cl.
G06K 9/62 (2022.01)
G06N 20/20 (2019.01)
G06V 10/25 (2022.01)

(52) U.S. Cl.
CPC ......... G06K 9/6256 (2013.01); G06K 9/6262 (2013.01); G06N 20/20 (2019.01); G06V 10/25 (2022.01)

(58) Field of Classification Search
CPC .. G06K 9/6256; G06K 9/3233; G06K 9/6262; G06N 20/20
See application file for complete search history.

(56) References Cited

U.S. PATENT DOCUMENTS

| 5,677,533 | A | 10/1997 | Yaktine et al. |
| 6,637,703 | B2 | 10/2003 | Matheson et al. |
| 6,768,551 | B2 | 7/2004 | Mian et al. |
| 7,328,871 | B2 | 2/2008 | Mace et al. |
| 7,507,965 | B2 | 3/2009 | Lane et al. |
| 7,724,962 | B2 * | 5/2010 | Zhu ...................... G06V 20/584 701/400 |
| 8,006,559 | B2 | 8/2011 | Mian et al. |

(Continued)

FOREIGN PATENT DOCUMENTS

CN 110494861 * 3/2018

OTHER PUBLICATIONS

Machine translation for CN 110494861 (Year: 2018).*

*Primary Examiner* — Qian Yang
(74) *Attorney, Agent, or Firm* — Morris, Manning & Martin, LLP; Daniel E. Sineway, Esq.

(57) ABSTRACT

Systems, devices, media, and methods are presented for training a predictive model to detect objects in digital images, such as detecting whether a cotter key is present or absent in a digital photograph of a rail car coupler. The training system includes curating a plurality of training datasets, each including a number of raw images, together with a number of adjusted, augmented, and duplicate images. The predictive model includes a localization algorithm and an ensemble of models for classification. The localization algorithm is a deep convolutional neural network (CNN) which identifies a region of interest. One of more of the deep CNN classification models generates a plurality of candidate regions associated with each region of interest, thereby generating a large number of additional regions useful for training. In use, the trained predictive model is part of a detection and notification system that processes new images from the field and broadcasts a notice when an anomaly is detected.

18 Claims, 10 Drawing Sheets

(56) References Cited

U.S. PATENT DOCUMENTS

| | | |
|---|---|---|
| 8,140,250 B2 | 3/2012 | Mian et al. |
| 8,296,000 B2 | 10/2012 | Denny et al. |
| 8,335,606 B2 | 12/2012 | Mian et al. |
| 9,061,594 B2 | 6/2015 | Wesche et al. |
| 9,098,739 B2 | 8/2015 | Dal Mutto et al. |
| 9,134,185 B2 | 9/2015 | Mian et al. |
| 9,151,681 B2 | 10/2015 | Arndt et al. |
| 9,296,108 B2 | 3/2016 | Mian et al. |
| 9,340,219 B2 | 5/2016 | Gamache et al. |
| 9,349,105 B2 | 5/2016 | Beymer et al. |
| 9,376,129 B2 | 6/2016 | Hilleary |
| 9,518,947 B2 | 12/2016 | Bartonek et al. |
| 9,865,103 B2 | 1/2018 | Kraeling et al. |
| 9,996,772 B2 | 6/2018 | Ahmed et al. |
| 10,012,546 B2 | 7/2018 | Bartonek et al. |
| 10,081,376 B2 | 9/2018 | Singh |
| 10,136,106 B2 | 11/2018 | Shubs, Jr. et al. |
| 10,196,078 B2 | 2/2019 | Shubs, Jr. et al. |
| 10,339,642 B2 | 7/2019 | Zhu et al. |
| 10,373,073 B2 | 8/2019 | Kisilev |
| 10,460,208 B1 | 10/2019 | Atsmon et al. |
| 10,710,615 B2 | 7/2020 | Georgeson et al. |
| 2010/0238290 A1 | 9/2010 | Riley et al. |
| 2014/0270548 A1* | 9/2014 | Kamiya .................. G06V 20/56 382/224 |
| 2015/0238148 A1 | 8/2015 | Georgescu et al. |
| 2016/0148078 A1 | 5/2016 | Shen et al. |
| 2016/0358337 A1 | 12/2016 | Dai et al. |
| 2017/0200092 A1* | 7/2017 | Kisilev ................. G06K 9/4628 |
| 2018/0349526 A1 | 12/2018 | Atsmon et al. |
| 2018/0374207 A1* | 12/2018 | Niculescu-Mizil ....... G06N 3/04 |
| 2019/0061791 A1 | 2/2019 | Yaktine et al. |
| 2019/0094154 A1 | 3/2019 | Iler |
| 2019/0235126 A1 | 8/2019 | Petruk et al. |
| 2020/0089998 A1* | 3/2020 | Zagaynov ............ G06K 9/6257 |
| 2020/0098172 A1 | 3/2020 | Atsmon |
| 2020/0104644 A1* | 4/2020 | Sato ...................... G06K 9/6256 |
| 2020/0311944 A1* | 10/2020 | Cao ......................... G06T 7/136 |
| 2021/0089771 A1* | 3/2021 | Fu ............................. G06T 7/11 |
| 2021/0225005 A1* | 7/2021 | Vartakavi ............. G06K 9/6262 |

\* cited by examiner

| Candidate Regions → | CR-1 | CR-2 | CR-3 | ... | CR-n | Score (by Model) |
|---|---|---|---|---|---|---|
| Classification Model 1 | P | P | P | ... | A | P |
| Classification Model 2 | P | A | P | ... | A | P |
| Classification Model 3 | A | A | A | ... | P | P |

FIG. 7

TWO-STAGE DEEP LEARNING FRAMEWORK FOR DETECTING THE CONDITION OF RAIL CAR COUPLER SYSTEMS

TECHNICAL FIELD

Examples set forth in the present disclosure relate to machine learning. More particularly, but not by way of limitation, the present disclosure describes a two-stage system for training algorithms to detect objects in an image by training a single deep-learning localization algorithm and an ensemble of deep-learning models for classification.

BACKGROUND

Mathematical models are used to describe the operation and output of complex systems. A mathematical model may include a number of governing equations designed to calculate a useful output based on a set of input conditions, some of which are variable. A strong model generates an accurate prediction for a wide variety of input conditions. A mathematical model may include one or more algorithms. An algorithm is a sequence of computer-implemented instructions, typically designed to solve a particular problem or class of problems or to perform a computation.

Machine learning refers to an algorithm that improves incrementally through experience. By processing a large number of different input datasets, a machine-learning algorithm can develop improved generalizations about particular datasets, and then use those generalizations to produce an accurate output or solution when processing a new dataset. Broadly speaking, a machine-learning algorithm includes one or more parameters that will adjust or change in response to new experiences, thereby improving the algorithm incrementally; a process similar to learning.

In the context of computer vision, mathematical models attempt to emulate the tasks accomplished by the human visual system, with the goal of using computers to extract information from an image and achieve an accurate understanding of the contents of the image. Computer vision algorithms have been developed for a variety of fields, including artificial intelligence and autonomous navigation, to extract and analyze data in digital images and video.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 7 is a diagrammatic representation of example scores generated during training.

DETAILED DESCRIPTION

Figure 1:
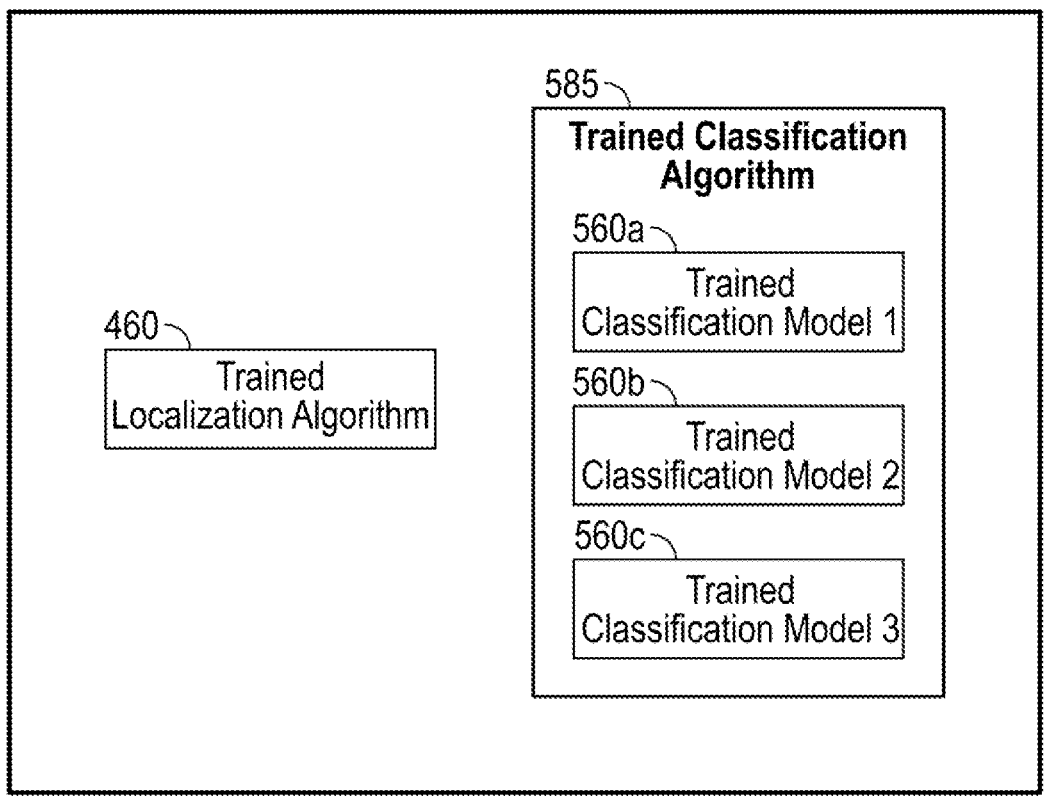
FIG. 1 is a block diagram of an example predictive model.

Various implementations and details are described with reference to examples including a method of generating a predictive model, including the step of storing, in a master image database, a plurality of raw images together with one or more conditions associated with each image. The method further includes generating a plurality of secondary images based on the plurality of raw images. The secondary images include one or more adjusted images, augmented images, and duplicate images, all of which are stored in the master image database. Next, the method includes curating a plurality of training datasets that include raw images and secondary images selected from the master image database. The training datasets are used to train a classification algorithm which, in accordance with some examples, is made up of an ensemble of deep-learning classification models. Each classification model is trained with a different training dataset.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Aspects of the present disclosure relate to the training of machine-learning algorithms and models with a plurality of training datasets. Without limiting the scope of the disclosure, various aspects are described through a discussion of various examples, including the training of a predictive model to analyze the contents of digital photographic images.

Example implementations of the present disclosure are directed toward a predictive model for analyzing digital images of rail cars to autonomously detect the state of couplings between rail cars. A rail car coupling or coupler is a mechanism to connect rolling stock (i.e., all types of wheeled rail cars, powered and unpowered) in a train. Trains use a wide variety of available couplers and securement systems. The health of coupler securements is critical to ensure a safe and reliable operation. Failure of a coupler securement on a moving train results in a partial or total disengagement between rail cars. The consequences of disengagement range from line-of-road delays to catastrophic derailment.

The Type E coupler is one of the most widely used in North America. E-Type couplers are attached to the rail car using a draft key or cross-key. The cross-key is secured by a retainer pin, which is typically secured in place using a cotter key. As trains move at high speeds, vibrations and movement between components can cause the cotter key to fall out. Without the cotter key, additional vibrations and movement can cause disengagement of the retainer pin and, eventually, the cross-key, leading to failure of the coupler securement.

Cameras positioned near the rails capture photographic images of the couplers between rail cars while a train is passing at track speed. These images can be used to supplement the periodic manual inspection of couplers. Camera systems deployed in the field are subject to harsh outdoor conditions, including the mechanical shock from passing trains, debris, and the full gamut of weather conditions.

Reference now is made in detail to the examples illustrated in the accompanying drawings and discussed below.

FIG. 1 is a block diagram of an example predictive model 1000 that includes two stages: a localization stage followed by a classification stage. The predictive model 1000, as shown, includes a trained localization algorithm 460 and a trained classification algorithm 585. The trained classification algorithm 585, in some example implementations, includes an ensemble of three trained classification models 560*a*, 560*b*, 560*c*. The ensemble may include more or fewer than three models, depending on the particular application. The algorithms are trained using the training system 210 and methods described herein.

Figure 2:
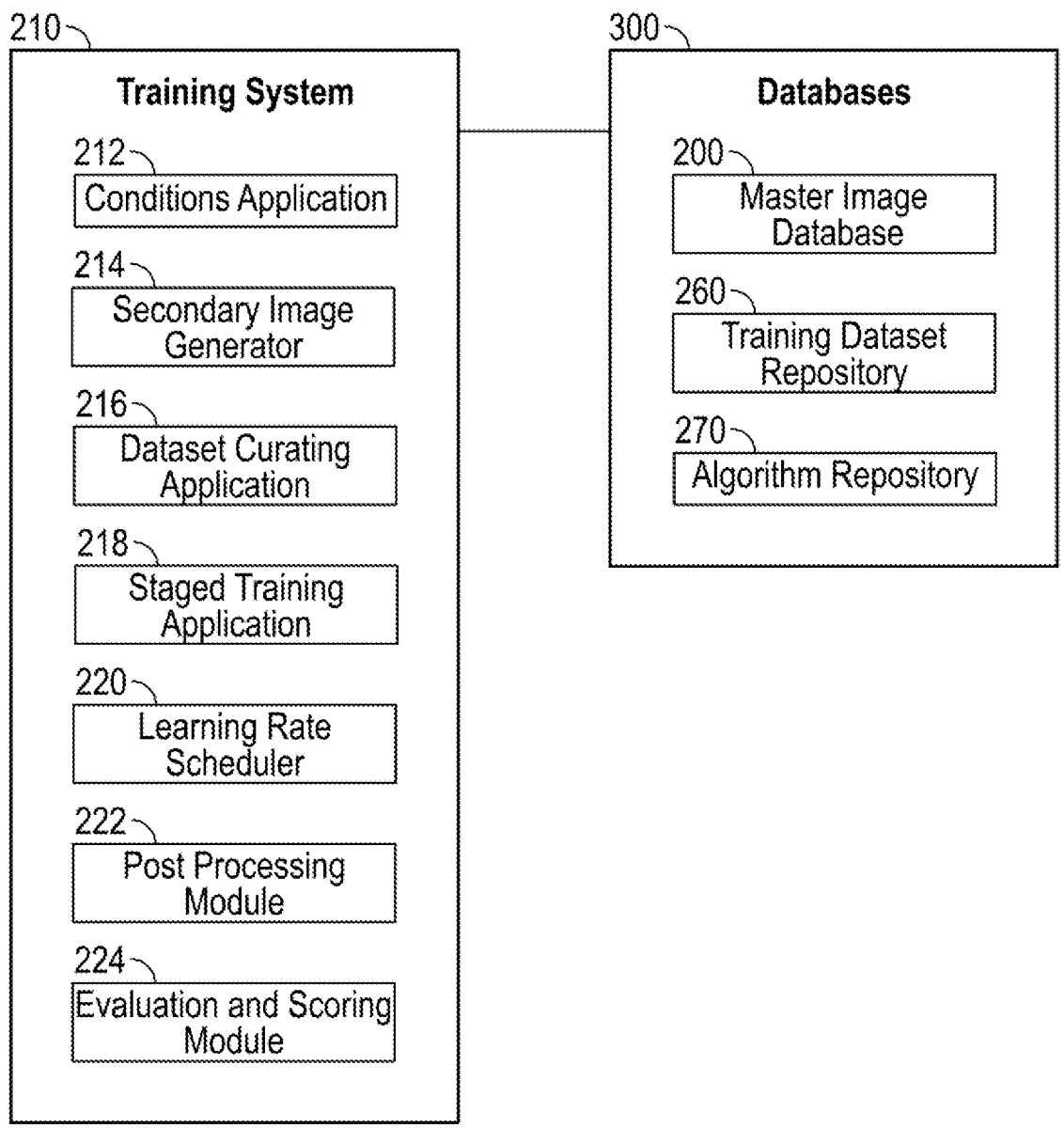
FIG. 2 is a block diagram of an example training system configured to manage and control the training of algorithms.

FIG. 2 is a block diagram of an example training system 210 designed to train the algorithms and models which are part of the predictive model 1000. The training system 210, as shown, is coupled to a number of databases 300, including a master image database 200, a training dataset repository 260, and an algorithm repository 270.

Figure 3:
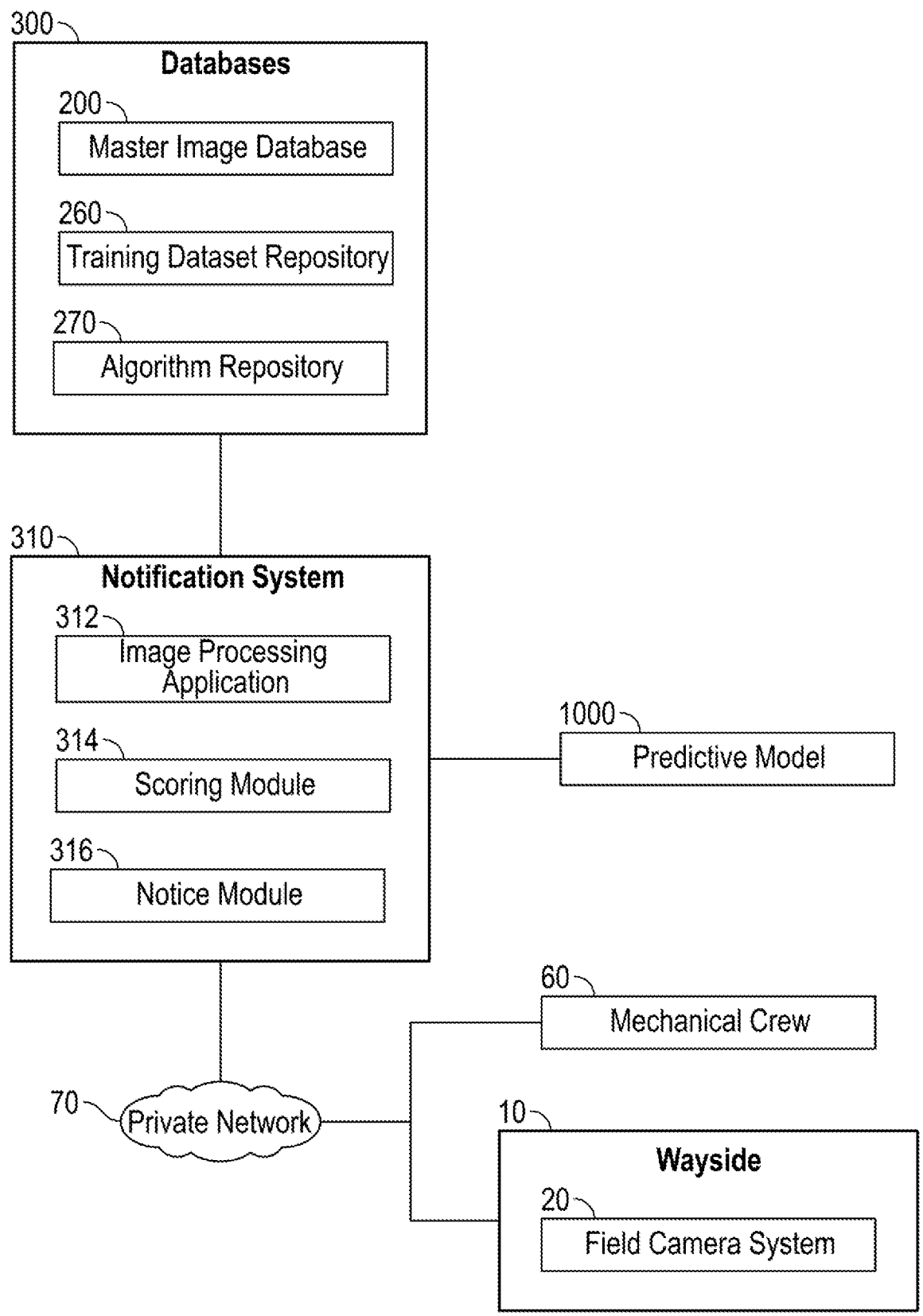
FIG. 3 is a block diagram of an example notification system configured for use with the predictive model to analyze and classify images captured in the field.

FIG. 3 is a block diagram of an example detection and notification system 310 configured for use with the predictive model 1000 to analyze and classify images captured in the field, in accordance with some example implementations. The detection and notification system 310, as shown, is communicatively coupled to one or more databases 300 and to the predictive model 1000. The notification system 310, in some implementations, includes an image processing application 312, a scoring module 314, and a notice module 316. The notification system 310 is coupled to remote equipment located in an area near a railway, known as a wayside 10, and to one or more crews, such as a mechanical crew 60, over a private network 70. A rail network may include one or more data centers, dispatchers, and a vast number of waysides 10, located in remote areas at or near the edges of the rail network. Each wayside 10 may house a variety of equipment, such as switches, train sensors, timers, weather sensors, communications equipment, and camera systems. The detection and notification system 310, in some implementations, is coupled to every wayside 10 that includes a field camera system 20. The field camera system 20, as described herein, includes one or more high-resolution digital cameras.

According to one example implementation, the elements shown in FIG. 3 are distributed between and among a plurality of edge servers located near the field camera systems 20. For example, one or more components of the detection and notification system 310 is stored locally, on an edge server, where images captured by the field camera system 20 are processed and scored, as described herein. A wayside 10, in this example, houses an edge server and a field camera system 20. The edge-computing arrangement avoids the risks associated with a poor connection to a distant server located far away from the field camera system 20. In this aspect, as described herein, the edge server may be equipped with preferred hardware, such as a graphics processing unit (GPU) that is particularly well suited to operate the detection and notification system 310.

Figure 4:
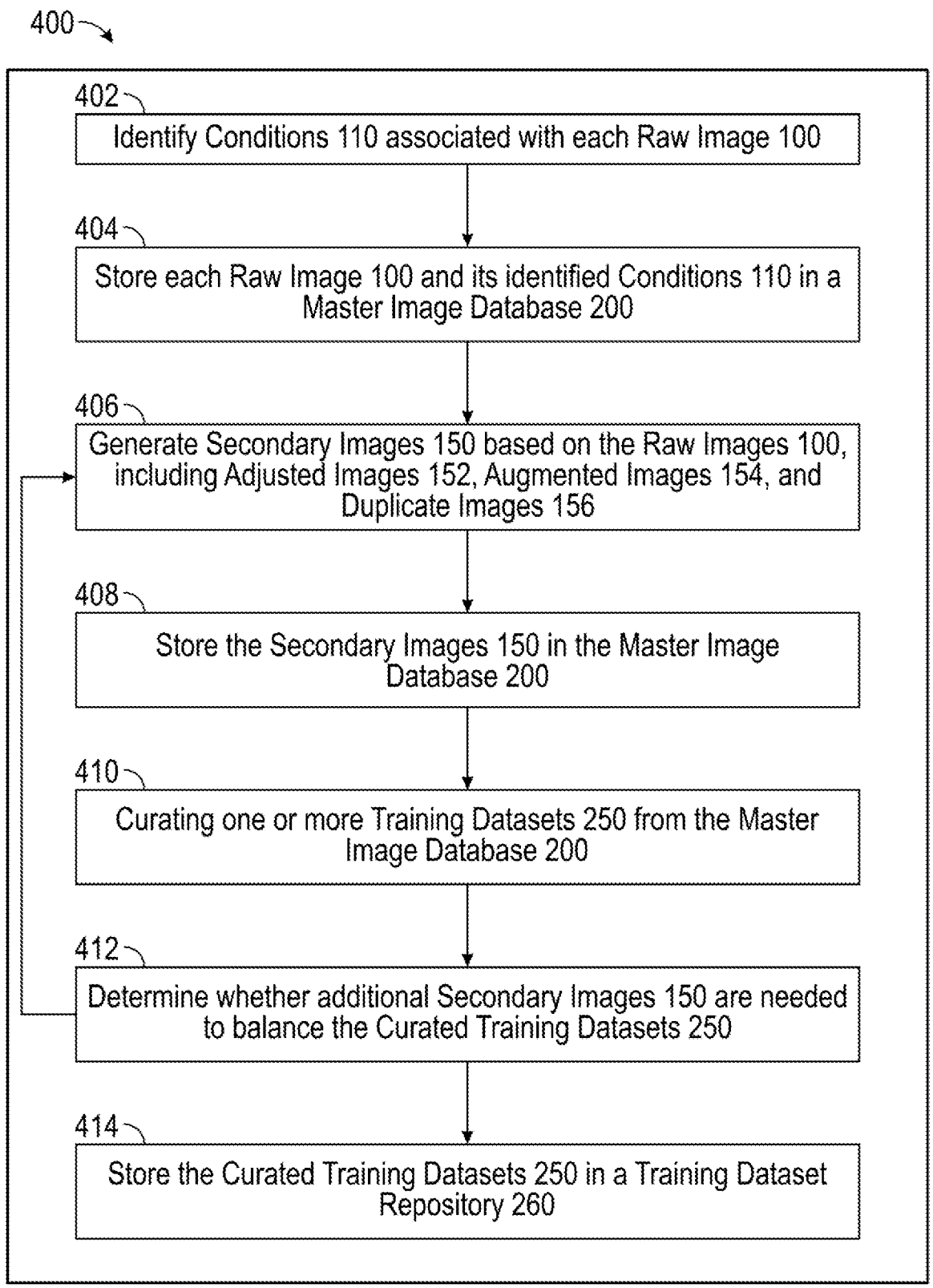
FIG. 4 is a flow chart depicting an example method of curating a plurality of training datasets.

FIG. 4 is a flow chart 400 depicting an example method that includes curating a plurality of training datasets 250 suitable for use with the predictive model 1000 described herein. The training datasets 250, as described herein, include images and related data stored in the master image database 200 which, in some implementations, is coupled to or includes a collection of raw images 100. According to example implementations that are directed toward rail cars and couplers, the raw images 100 include thousands of images of passing trains which were captured in the field using digital cameras. One or more of the steps shown and described may be performed simultaneously, in a series, in an order other than shown and described, or in conjunction with additional steps. Some steps may be omitted or, in some applications, repeated.

Block 402 represents the task of identifying one or more conditions 110 associated with each of a plurality of raw images 100. According to example implementations that are directed toward rail cars and couplers, the raw images 100 include thousands of images of the couplers between rail cars of passing trains which were captured in the field using digital cameras. One or multiple images may be captured, from different angles, of the area between rail cars where components of the coupler securement are expected to be found. The set of raw images 100 may include many thousands of images.

The field camera systems 20 deployed in the field may include one or more visible-light cameras that are positioned and oriented to capture images of various components of the coupler systems and coupler securement between rail cars. Examples of such cameras include high-resolution digital VGA cameras having a complementary metal-oxide-semiconductor (CMOS) image sensor, which are capable of resolutions of 640p (e.g., 640×480 pixels for a total of 0.3 megapixels), 720p, or 1080p. Some camera systems can capture high-definition (HD) still images and store them at a resolution of 1642 by 1642 pixels (or greater) and/or capture and record high-definition video at a high frame rate (e.g., thirty to sixty frames per second or more) and store the recording at a resolution of 1216 by 1216 pixels (or greater). Digital images typically comprise a matrix of pixels on a two-dimensional coordinate system that includes an X-axis for horizontal position and a Y-axis for vertical position. Each pixel includes color attribute values (e.g., a red pixel light value, a green pixel light value, or a blue pixel light value) and position attributes (e.g., an X-axis value and a Y-axis value). In this aspect, the raw images 100 described herein may be digital images, containing data that is accessible for processing by one or more of the algorithms described herein.

The raw images 100 captured by cameras in the field, in some examples, included little or no information about each image. In many types of datasets for training machine-learning algorithms (for diagnosing medical conditions, for example), the raw data might include only an image (e.g., an x-ray) and a result (e.g., a tumor is present or absent). Using an image alone, without also knowing the result, would have limited use as a training dataset because there would be no way to verify (during training) if the algorithm is making an accurate prediction.

Consistent with aspects of the present disclosure, the raw images 100 were captured in the field under a wide variety of input conditions. With a view toward curating a robust and balanced group of training datasets 250 (at block 410), the method 400 in FIG. 4 begins with the task of identifying one or more conditions 110 associated with each raw image 100.

The conditions 110, in some implementations, include conditions about the subject of the photograph (e.g., the coupler type, whether the cotter key is present or absent), geospatial site conditions (e.g., location, date, time), environmental conditions (e.g., weather, ambient lighting), and camera settings (e.g., camera type, exposure time, lens condition). In some example implementations, the conditions 110 about the subject of the photograph (e.g., the coupler) is binary; that is, a component such as the cotter key is either present or absent.

The selection and entry of data about the conditions 110 improves the depth and level of detail supporting each image selected for use in one of the training datasets. The conditions 110 may be identified by observation and selected manually or, in some implementations, a computer can be configured to extract one or more conditions 110 associated with each image. As shown in FIG. 2, a conditions application 212 facilitates the process of identifying, categorizing, and otherwise processing the entry of conditions 110 associated with each raw image 100.

At block 404, each raw image 100 together with one or more conditions 100 is stored in a master image database 200. The conditions application 212, in some implementations, manages the storing process.

At block 406, secondary images 150 are generated in order to increase the quantity of images available, among other purposes. As shown in FIG. 2, a secondary image generator 214 facilitates the process of generating secondary images 150, as described herein.

Secondary images 150, in some implementations, are generated by adjusting images (e.g., to a lower resolution, smaller size), augmenting images (e.g., blurring, brightening) and duplicating images (also known as up-sampling).

High-resolution images include greater detail but processing them is computationally expensive and time consuming. Low-resolution images may lack sufficient detail for useful evaluation. In this aspect, this step of generating secondary images 150 by adjusting includes re-sizing the raw images 100 to generate a secondary image having a resolution that is relatively lower but still sufficiently high. In this aspect, the secondary image generator 214 includes a re-sizing application or routine. A single raw image, in some implementations, may be the basis of many secondary images 150 having different resolutions.

Augmenting images is one way to deliberately generate secondary images 150 that have one or more imperfections, in varying degrees. In operation, as described herein, many of the raw field images 190 to be processed will include a variety of imperfections. Using augmented images in the training stages will make the algorithms and models more resilient and more capable of handling imperfect images. Some training systems use random blurring and brightening to generate supplemental images. Random blurring, for example, applies a random degree of blur to an image. Random brightening adjusts the contrast to a random degree. In this aspect, the secondary image generator 214 includes one or more random blurring and brightening routines.

Consistent with aspects of the present disclosure, the process of generating secondary images 150 includes selecting and applying augmentation techniques to generate images that simulate or mimic one or more of the conditions 110 associated with the raw images 100. In addition to random blurring, for example, the process of generating secondary images 150 includes selecting a degree of blur that will simulate an environmental condition, such as fog, or a site condition, such as debris on the camera. In addition to random brightening, the process of generating secondary images 150 in some implementations includes region-based, dynamic brightening, in which one or more selected portions of a raw image 100 are brightened or darkened. For example, the contrast may be adjusted for a region of interest in the image near where the cross-key, retainer pin, and/or cotter key should be located, in order to simulate various lighting conditions that might impact the capacity of the algorithms and models to identify and detect the cotter key in an image. The secondary image generator 214 includes one or more settings associated with the random blurring and brightening routines in order to facilitate and execute these augmentation techniques.

The process of generating secondary images 150 further includes generating duplicate images, including duplicates of raw images 100 and/or other secondary images 150. For example, the collection of raw images 100 may include relatively few images in which the cotter key is absent. Generating duplicates of such images may be required so that, when curating a training dataset 250 (as described herein, at block 410) the master image database 200 will include a sufficient number of secondary images 150 in which the cotter key is absent. In this aspect, the secondary image generator 214 includes a duplication routine governed by one or more control settings.

At block 408 the secondary images 150 are stored in the master image database 200. Consistent with aspects of the present disclosure, each secondary image 150 may be associated with the original raw image 100 on which it is based. The storing process may be controlled and executed by the secondary image generator 214.

Block 410 represents the process of curating training datasets 250 using images stored in the master image database 200. Generally speaking, one goal of curating a training dataset 250 is to present the model with a set of images that closely represents the variety of conditions 110 likely to occur in the real world, so that the model is trained and ready to process new images from the field which were captured under real-world conditions. A random set of images is not likely to train a model adequately. As shown in FIG. 2, the training system 210, in some implementations, includes a dataset curating application 216 configured to manage the process of curating, as described herein.

Curating a training dataset 250 is accomplished in conjunction with the other steps in this example method 400, including identifying conditions 110 (at block 402) and generating secondary images 150 (at block 406). For example, to achieve a balanced dataset, additional blurred images may be desired, which may involve generating additional secondary images 150 by applying random or purposeful blurring. Curating is an iterative process, applied at varying degrees of granularity, and managed by the dataset curating application 216. For example, block 412 represents the task of determining whether additional secondary images 150 are needed to improve the balance of images in any of the curated training datasets 250. The determination, as well as other aspects of the process, may be performed by a computer. In another example, purposeful blurring may be applied to generating secondary images 150 that simulate a particular environmental condition, such as fog, for the purpose of curating a training dataset 250 that will better train that algorithms and models to process raw images captured in foggy conditions of various densities.

Consistent with aspects of the present disclosure, the process of curating at block 410 may generate hundreds or thousands of training datasets 250, each containing thousands of images (raw images 100 and secondary images 150).

A single curated training dataset 250, in some implementations, includes a training set, a validation set, and a testing set. The training set is used to train the algorithms and models. The validation set is a set used between stages of training, to conduct an interim evaluation of the results and measure how well the algorithm is improving. In this aspect, the validation set may reveal over-fitting, under-fitting, or other undesirable trends in the results, which may prompt an early stop. The testing set, sometimes referred to as a hold-out set, is used to evaluate the model after a number of training stages.

In some example implementations, the training set contains about seventy percent of the images in the training dataset 250; the validation set about twenty percent; and the testing set about ten percent. This distribution may be adjusted, as needed. Other distributions among the sets may be appropriate for training particular algorithms or models. The sets may contain one or more images common to the other sets; in other words, the sets need not be subsets of the training dataset 250.

At block 414 the curated training datasets 250 are stored in a training dataset repository 260.

Deep learning refers to a class of machine-learning methods that are based on or modeled after artificial neural networks. An artificial neural network is a computing system made up of a number of simple, highly interconnected processing elements (nodes), which process information by their dynamic state response to external inputs. A large artificial neural network might have hundreds or thousands of nodes.

A convolutional neural network (CNN) is a type of neural network that is frequently applied to analyzing visual images, including digital photographs and video. The connectivity pattern between nodes in a CNN is modeled after the organization of the human visual cortex, which includes individual neurons arranged to respond to overlapping regions in a visual field.

Figure 5:
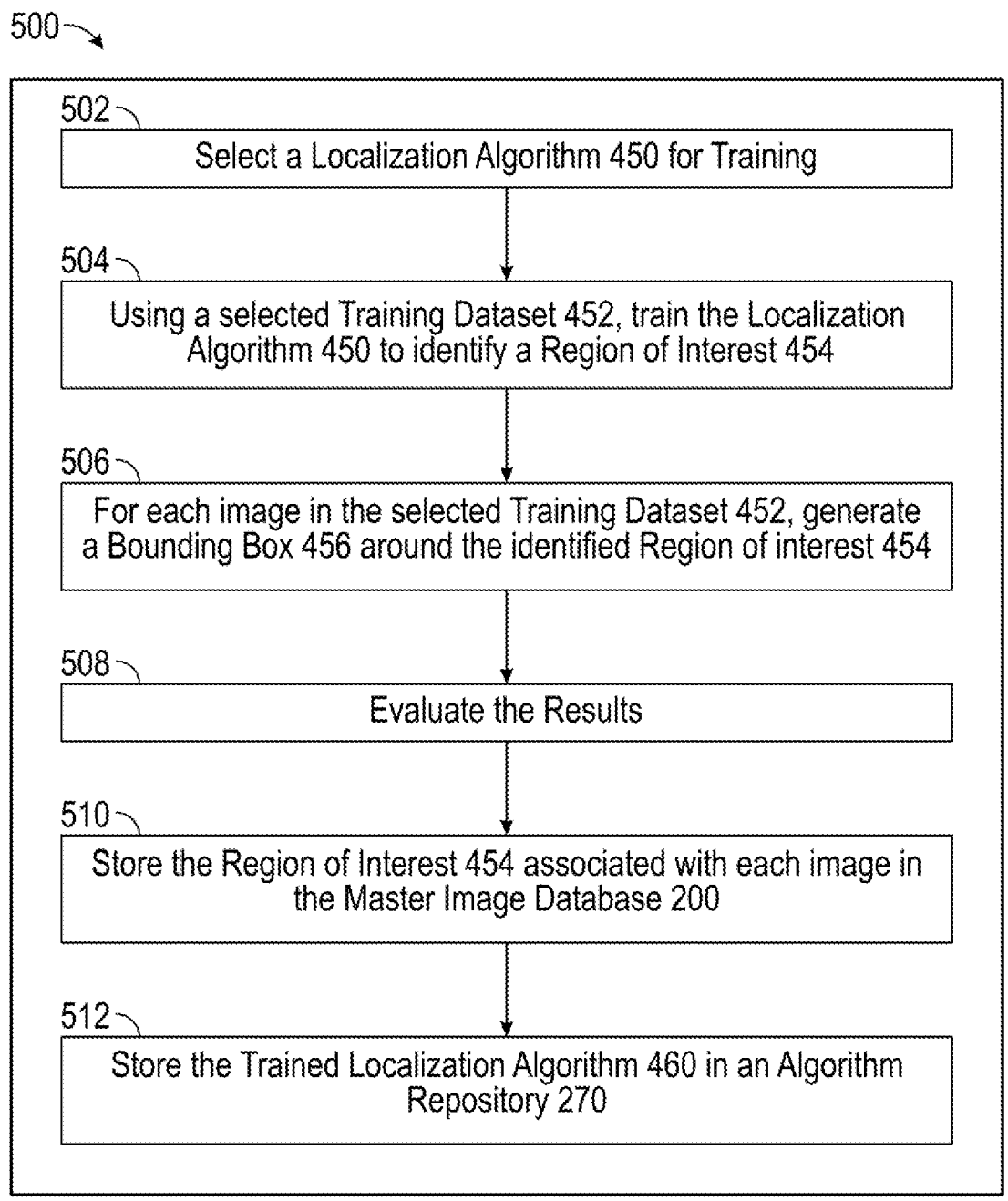
FIG. 5 is a flow chart depicting an example method of training a deep-learning localization algorithm.

FIG. 5 is a flow chart 500 depicting an example method of training a localization algorithm 450 for use with the predictive model 1000 described herein. One or more of the steps shown and described may be performed simultaneously, in a series, in an order other than shown and described, or in conjunction with additional steps. Some steps may be omitted or, in some applications, repeated.

Block 502 represents the task of selecting a localization algorithm 450 to be trained. Localization, as used herein, refers to the process of using an algorithm to identify a region of interest in a digital image. The region of interest, in this example, is that portion of the image where the coupler (e.g., cross-key, retainer pin, cotter key) is located. The localization algorithm 450 may be selected from any of a variety of image segmentation algorithms, some of which analyze digital images pixel by pixel to locate a region of interest. Localization algorithms are used in a variety of computer vision applications, such as medical diagnostic imaging, autonomous vehicle navigation, and augmented reality systems. From this disclosure, those of ordinary skill in the art will be able to identify any number of possible localization algorithms that are suitable for use in accordance with the example implementations described herein.

The localization algorithm 450, in an example implementation, is a convolutional neural network.

At block 504, a selected training dataset 452, which has been curated as described herein, is used for training the selected localization algorithm 450. The selected training dataset 452 may include a training set, a validation set, and a testing set. Using the selected training dataset 452, the selected localization algorithm 450 is trained to identify a region of interest 454 in each image.

Training of a selected algorithm or model, in some implementations, proceeds in stages and is controlled by a staged training application 218. For example, the staged training application 218 presents portions of the training set to the localization algorithm 450 in stages; presenting the validation set between stages to evaluate the progress of the algorithm 450. The staged training application 218, together with the learning rate scheduler 220, regulates and modulates the presentation of the sets within a training dataset 250 to facilitate the training in an efficient and controlled manner.

The staged training application 218, in some implementations, includes or is coupled to a learning rate scheduler 220. In the context of machine learning, the learning rate is a parameter or algorithm that determines the step size at each iteration or stage of training. A learning rate scheduler 220 works in conjunction with the staged training application 218 to avoid over-fitting, under-fitting, and other statistical phenomena that lead to poor training outcomes. Over-fitting describes a situation in which the algorithm corresponds so closely to a particular set of data that, when presented with new data, it will not produce accurate predictions. When over-fitting occurs, or begins to occur, the learning rate scheduler 220 will pause the training, between stages, and the staged training application 218 will use one of the validation sets (from the selected training dataset 452) to conduct an interim evaluation of the progress of the localization algorithm 450.

The learning rate scheduler 220 includes a number of adjustable parameters, such as step size, the time between iterations, and the mathematical distance between nodes in an artificial network. In this aspect, the learning rate scheduler 220 includes an interface or similar tool for adjusting the parameters to accommodate a particular training task. For example, a learning rate scheduler 220, configured with a set of parameters specifically for localization, may be used during training of the localization algorithm 450 (block 504). A learning rate scheduler 220, configured with a different set of parameters tailored specifically to classification, may be used during training of the classification models 550a, 550b, 550c. In a related aspect, the parameters for a particular learning rate scheduler 220 may be adjusted during training at any time (e.g., between stages, after using a validation set) in order to fine-tune the speed and progress of the training. From this disclosure, those of ordinary skill in the art will understand and be able to identify any number of parameters that can be adjusted and used, in accordance with the example implementations.

At block 506, the selected localization algorithm 450 during training, in some implementations, generates a bounding box 456 around the region of interest 454. In the context of a digital image, the bounding box 456, in some implementations, is a polygon defined by a number of edges and vertices. The bounding box 456 may be further defined by one or more sets of coordinates, relative to an established image coordinate system.

At block 508, the results produced by the selected localization algorithm 450 are evaluated, in some implementations, using a validation set (of the selected training dataset 452). In this aspect, the validation set includes raw images 100 and/or secondary images 150, together with a condition or value that describes where the region of interest is located in the image. In this aspect, the one or more conditions 110, as described herein, includes a value or set of values defining the region of interest. Evaluating the results, at block 508, includes determining whether the region of interest 454 in the results matches the stored region of interest for the image. The accuracy of the match may be expressed in terms of degree, such as a percentage overlap, such that the results indicate the relative progress (or regress) of the selected localization algorithm 450 being trained. Evaluating the results, at block 508, in some implementations, is executed and controlled by an evaluation and scoring module 224.

The evaluation and scoring module 224, in some implementations, includes one or more post-processing tools or techniques, such as de-noising and other quality enhancements. In some examples, the localization algorithm 450 during training will identify two or more regions of interest 454 in the same image, each having its own confidence value. In such cases, the evaluation and scoring module 224 may compare the two regions and select the one with the higher confidence value.

In other cases, where the confidence values may be relatively equivalent, the identification of two regions of interest may be accurate. Some types of rail car coupling systems include two couplers, each of which may be located in a different region of a raw image 100. In such cases, the identification of two regions of interest is accurate and legitimate. The evaluation and scoring module 224, in some implementations, includes a tool for detecting whether the two regions of interest lie along or close to the same or similar plane (e.g., typically, the same vertical plane) in the image. A vertical plane, for example, may be established using pixel coordinates and other reference planes in the image. In this aspect, the evaluation and scoring module 224 may approve the identification of two regions of interest, both of which may be stored in a record associated with the same raw image 100 in the master image database 200.

At block 510, after determining that the evaluated results meet or exceed a predetermined threshold, the region of interest 454 associated with each image, as determined by the newly trained localization algorithm 460, is in the master image database 200 in a record associated with the original raw image 100 and/or the secondary image 150. In this aspect, the region of interest 454 associated with each image is stored and available for retrieval and use by subsequent algorithms, as described herein.

At block 512, the newly trained localization algorithm 460 is stored in an algorithm repository 270.

Consistent with aspects of the present disclosure, training of the selected localization algorithm 450 is conducted separate and apart from the training of a classification algorithm 580.

Figure 6:
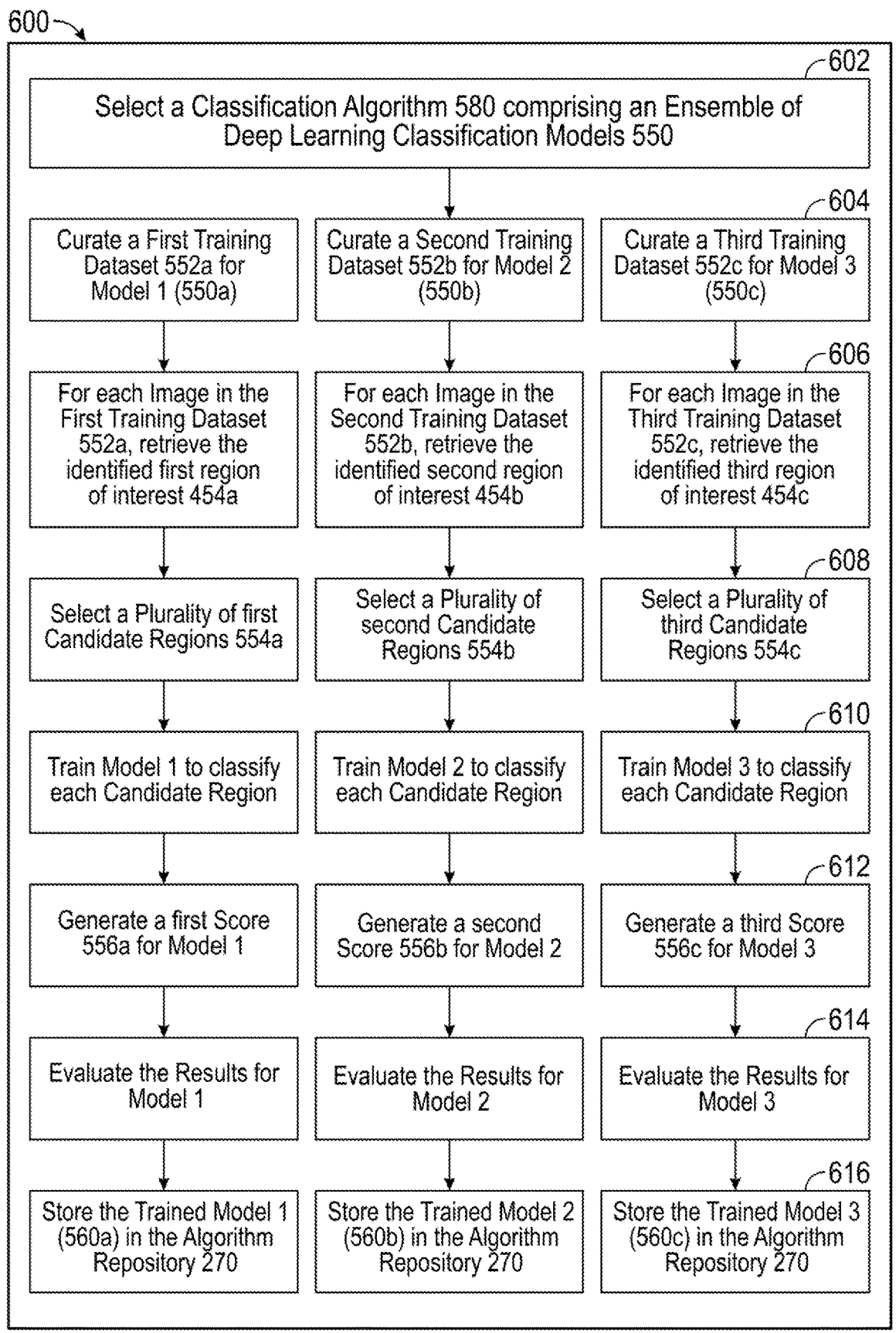
FIG. 6 is a flow chart depicting an example method of training an ensemble of deep-learning classification models.

FIG. 6 is a flow chart 600 depicting an example method of training an ensemble of deep-learning classification models 550. Like the training of the localization algorithm 460 described above, the staged training application 218 is also used to train the ensemble of deep-learning classification models 550. One or more of the steps shown and described may be performed simultaneously, in a series, in an order other than shown and described, or in conjunction with additional steps. Some steps may be omitted or, in some applications, repeated.

Block 602 represents the task of selecting a classification algorithm 450 to be trained. Classification, as used herein, refers to the process of using an algorithm to classify an image according to the condition of the coupler securement. In one example, an image may be classified as "cotter key present" if the cotter key is detected in the image. The classification, in some implementations, includes the cotter key only and a binary condition: "cotter key present" or "cotter key absent."

The classification algorithm 580 may be selected from any of a variety of classification algorithms, some of which analyze digital images to identify edges, borders, and objects in the image. Classification algorithms are used in a variety of computer vision applications, such as medical diagnostic imaging, robotic vision, and autonomous vehicle navigation. From this disclosure, those of ordinary skill in the art will be able to identify any number of possible classification algorithms that are suitable for use in accordance with the example implementations described herein.

Instead of selecting a single algorithm, the classification algorithm 580 consists of an ensemble of deep-learning classification models 550, as shown in FIG. 1 and FIG. 6. The ensemble of models 550 may include any number of suitable models capable of being trained to analyze and identify objects or conditions in digital images. The example ensemble, as shown, includes three models 550a, 550b, 550c. The ensemble may include more or fewer than three models, depending on the particular application.

In an example implementation, one or more of the classification models 550a, 550b, 550c is a convolutional neural network.

At the three blocks 604, the process of curating a training dataset, as described herein, is applied to curating training datasets 552a, 552b, 552c for use in training each model 550a, 550b, 550c, respectively. The dataset curating application 216, in some implementations, is configured to manage the process of curating the training datasets 552a, 552b, 552c. In a preferred implementation, the training datasets 552a, 552b, 552c are separate and distinct from one another, so that the models 550a, 550b, 550c when trained and used together, will be more robust, compared to training with a single dataset.

At blocks 606, the region of interest 454 for each image in the training dataset is retrieved from the master image database 200. As described for block 510, in FIG. 5, the localization algorithm 450 identifies a region of interest 454 for each image and stores the region of interest 454 in a record that is associated with the original raw image 100 and/or the secondary image 150. The identified region of interest 454, for certain types of rail car coupling systems that include two couplers, may include two or more regions of interest. In this example, the trained localization algorithm 460 supplies the region of interest 454 for use by the ensemble of classification models 550a, 550b, 550c. In situations where a region of interest 454 has not been identified and stored for a particular image, the system initiates the trained localization algorithm 460 to identify the region of interest for that particular image. At block 606, the first region of interest 454a for each image in the first training dataset 552a is retrieved and used to train the first classification model 550a; and so forth, for the other models 550b, 550c. The staged training application 218, in some implementations, is configured to perform and manage the retrieval of regions of interest.

At block 608, the method includes selecting a plurality of candidate regions that are associated with each region of interest. In this aspect, a single region of interest serves as the basis for a number of candidate regions that are closely related to the region of interest. The candidate regions may overlap all or part of the region of interest, encompassing areas at least partly outside the region of interest. The plurality of candidate regions, in some implementations, is an odd number, such as twenty-one, to avoid a tie score when evaluating results, as described herein.

For training purposes, the selection of candidate regions greatly increases the number of images available for training. For example, an initial group of 100 regions of interest (in each of 100 images in a training dataset) and twenty-one candidate regions for each region of interest generates 2,100 images (100 times 21) available for training. Using the 2,100 images to train the three classification models 550a, 550b, 550c represents 6,300 training events (2,100 times 3) which are based on the initial group of 100 regions of interest. In contrast, many classification algorithms designed for image processing are trained with images having only a single region of interest.

Using the first classification model 550a as an example; at block 608, for the first region of interest 454a associated with each image in the first training dataset 552a, a plurality of first candidate regions 554a are identified. The plurality of first candidate regions 554a includes a number of candidate regions, such as twenty-one. Similarly, candidate regions 554b, 554c are selected for the other models 550b, 550c, respectively.

Training of each classification model 550a, 550b, 550c, in some implementations, proceeds in stages and is controlled by the staged training application 218. For example, the staged training application 218 presents portions of the training set to each classification model 550a, 550b, 550c in stages; presenting the validation set between stages to evaluate the progress of each model. The staged training application 218 regulates and modulates the presentation of the sets within each curated training dataset 552a, 552b, 552c, respectively, to facilitate the training in an efficient and controlled manner.

The learning rate scheduler 220, with a set of parameters selected for the training of each classification model 550a, 550b, 550c, is applied in conjunction with the staged training application 218 to avoid over-fitting and under-fitting, as well as other statistical phenomena that lead to poor training outcomes.

At block 610, each classification model 550a, 550b, 550c is trained to classify each plurality of candidate regions 554a, 554b, 554c, respectively. For example, the first model 550a is trained to classify each of the twenty-one candidate regions in the first plurality of candidate regions 554a.

At block 612, a score 556a, 556b, 556c is generated for each model, based on the results of each stage of the training. An example scoring is illustrated in FIG. 7. The evaluation and scoring module 224, in some implementations, is configured to generate a score for each model, and to evaluate the results (at block 614).

At block 614, the results produced by each classification model 550a, 550b, 550c are evaluated, in some implementations, using a validation set (which is part of each training dataset 552a, 552b, 552c, respectively). In general, a validation set, as described herein, includes raw images 100 and/or secondary images 150, together with a condition or value that describes where the region of interest is located in the image. However, or purposes of evaluating the models 550a, 550b, 550c, the validation set also includes, in each image record, a reference to each region of interest 454a, 454b, 454c, and each of the plurality of candidate regions 554c. Using this record, the results for a candidate region can be related back to the recorded condition associated with the original raw image 100 or secondary image 150. Evaluating the results, at block 614, in some implementations, is executed and controlled by the evaluation and scoring module 224 described herein.

At block 616, each newly trained classification model 560a, 560b, 560c is stored in an algorithm repository 270.

FIG. 7 is a diagrammatic representation of example scores associated with the training an ensemble of deep-learning classification models 550a, 550b, 550c, as described herein. As shown, for a single image in a training dataset, a single region of interest serves as the basis for a plurality of candidate regions CR-1, CR-2, CR-3, . . . CR-n, where n in this example is an odd number such as twenty-one. The score for each candidate region, and each model, is expressed in binary terms, such as cotter key present (P) or cotter key absent (A), and the score for each model is tallied according to a simple majority.

For the first classification model 550a, the scores (P or A) are shown for each of the first plurality of candidate regions 554a (e.g., each of twenty-one regions, in this example). The first score 556a (P) represents the simple majority of scores for the first model 550a. In other words, the first score 556a (P) indicates that most of the scores were P (i.e., at least eleven P scores, compared to ten A scores). Similarly, the scores 556b, 556c are tallied by simple majority for the second and third classification models 550b, 550c, respectively. The composite score 700 is determined by simple majority from the three scores 556a, 556b, 556c, as shown.

Referring again to block 616 of FIG. 6, each newly trained classification model 560a, 560b, 560c is stored in an algorithm repository 270. The trained models 560a, 560b, 560c together form a trained classification algorithm 585, as shown in FIG. 1. The predictive model 1000, including the trained classification algorithm 585 and the trained localization algorithm 460, is ready to use for analyzing new images. For example, the predictive model 1000 may be used with a detection and notification system 310, as shown in FIG. 3.

FIG. 3 is a block diagram of an example detection and notification system 310 configured for use with the predictive model 1000 to analyze and classify new images captured in the field. The notification system 310, as shown, is coupled to the predictive model 1000 and to one or more databases 300. The notification system 310, in some implementations, includes an image processing application 312, a scoring module 314, and a notice module 316.

Figure 8:
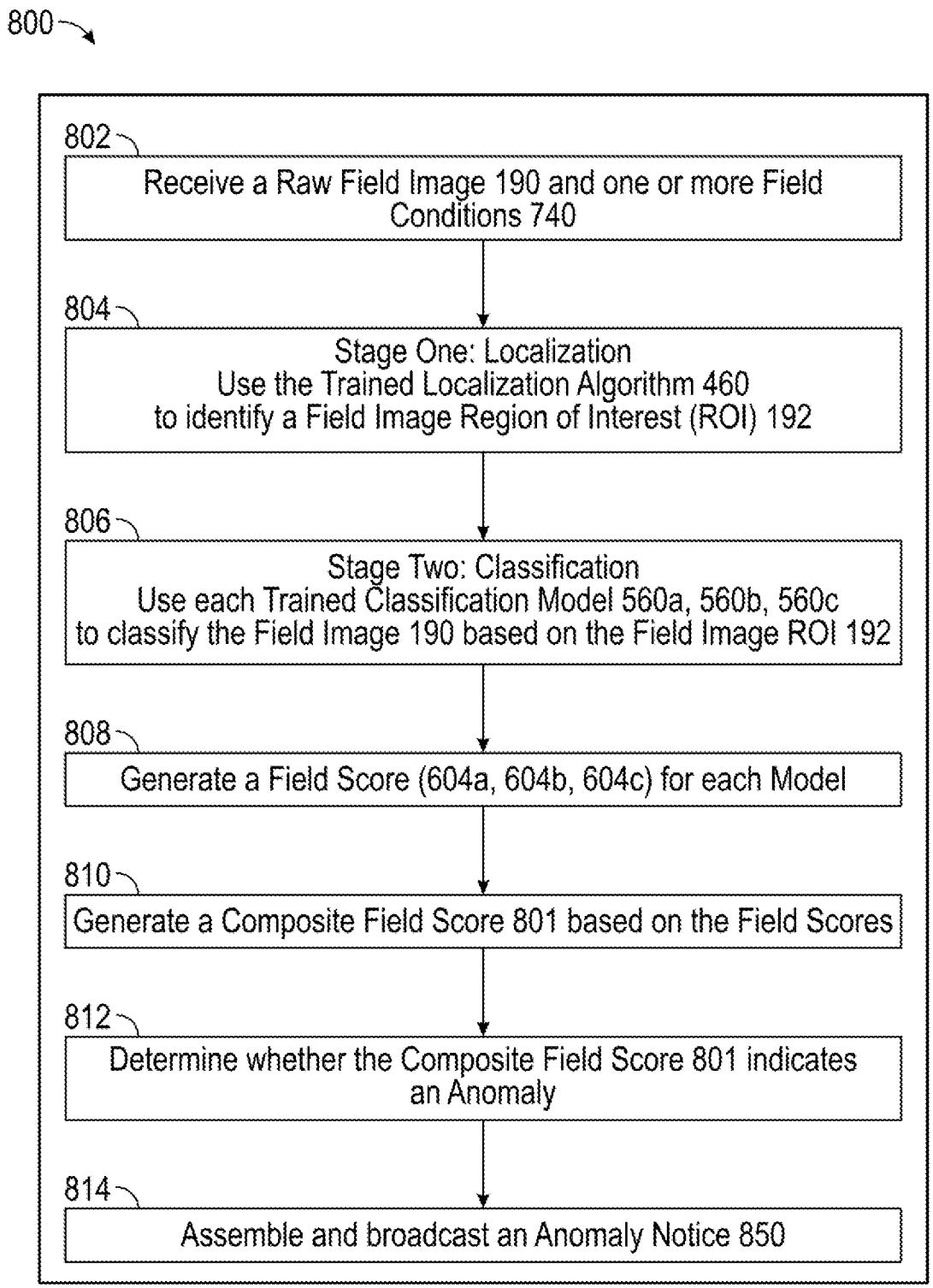
FIG. 8 is a flow chart depicting an example method of processing raw field images using the notification system shown in FIG. 3.

FIG. 8 is a flow chart 800 depicting an example method of processing raw field images 190 using the detection and notification system 310 shown in FIG. 3. One or more of the steps shown and described may be performed simultaneously, in a series, in an order other than shown and described, or in conjunction with additional steps. Some steps may be omitted or, in some applications, repeated.

At block 802, the notification system 310 receives a raw field image 190 from a camera system 20 deployed in the field. The raw field image 190 may include two or more images, per axle, captured by two or more cameras mounted in different orientations. The notification system 310, in some implementations, also receives one or more field conditions 740 associated with each raw field image 190. For example, the field conditions 740 include at least a location (e.g., a geographic location or an identifier, such as a wayside number), a date and time, and a rail car identifier (e.g., one or both of the rail car numbers). In some example implementations, data describing the one or more field conditions 740 may include information obtained from other elements of the rail network, such as a Geographic Information System (GIS), a train control and dispatch system, a transportation event processor, and a message router. The GIS, for example, includes location information (e.g., latitude, longitude, and elevation) about every wayside 10 and field camera system 20 throughout the rail network.

The image processing application 312 shown in FIG. 3, in some implementations, is configured to send a series of requests for raw field images 190 over a private network 70 to the field camera systems 20 throughout a rail network, according to a predetermined time interval (e.g., every ten minutes). Alternatively, one or more of the field camera systems 20 may be configured to transmit raw field images 190 to the image processing application 312 immediately following the capture of a set of raw field images 190 associated with a passing train. For example, when a train passes a wayside 10 equipped with a field camera system 20, the camera captures raw field images 190 of the couplers between all the rail cars. A train may include hundreds of rail cars. The field camera system 20 may capture and store raw field images 190 in a relatively continuous series for several minutes. When the field camera system 20 stops capturing images for a configurable duration (e.g., thirty seconds), the field camera system 20 may be configured to transfer the locally stored set of raw field images 190—together with one of more field conditions 740 associated with the set—to the notification system 310 for processing and analysis.

Upon receipt, the notification system 310 (at block 802) stores each raw field image 190 and its associated field conditions 740 in the master image database 200.

Blocks 804 and 806 represent the task of processing the raw field image 190 using the predictive model 1000. The image processing application 312 shown in FIG. 3, in some implementations, is configured to execute the steps described in blocks 804 and 806.

At block 804, the trained localization algorithm 460 identifies a region of interest in each raw field image 190, referred to herein as the field image region of interest 192. Consistent with some example implementations, the image processing application 312 retrieves each raw field image 190 from the master image database 200 and presents it to the trained localization algorithm 460. The trained localization algorithm 460 analyzes each raw field image 190 and identifies a region of interest 192. The region of interest 192 is returned to the image processing application 312, which stores the region of interest 192 in the master image database 200 in the record associated with the raw field image 190.

At block 806, the image processing application 312 retrieves each field image region of interest 192 from the master image database 200 and presents it to each of the three trained classification models 560a, 560b, 560c for analysis and classification. The classification, as described herein, may include the cotter key only and a binary condition: cotter present or cotter key absent. One or more of the trained classification models 560a, 560b, 560c, as described herein, may selected a plurality of candidate regions associated with each region of interest 192. In this aspect, the classification result from each model may include a result for each of the candidate regions. The classification result from each model is returned to the image processing application 312, which stores the classification result in the master image database 200, in the record associated with the field image region of interest 192 and its corresponding raw field image 190.

At block 808, a scoring module 314 of the notification system 310 generates a field score 604a, 604b, 604c based on the classification results obtained by each model, respectively. When the classification result for a model includes a result for each of a number of candidate regions, the field score is tallied according to a simple majority, as illustrated in FIG. 7.

At block 810, the scoring module 314 generates a composite field score 801 is tallied by simple majority, based on the three field scores 604a, 604b, 604c. The scoring module 314, in some implementations, stores the composite field score 801 and the field scores 604a, 604b, 604c in the master image database 200, in the record associated with the field image region of interest 192 and its corresponding raw field image 190.

At block 812, the notification system 310 retrieves and analyzes the composite field score 801 to determine whether the composite field score 801 indicates an anomaly. An anomaly, as used herein, includes any negative condition associated with a coupler securement. For example, when the classification result includes the cotter only, an anomaly exists when the classification result is 'cotter key absent.'

At block 814, the notice module 316 of the notification system 310 assembles an anomaly notice 850 for broadcast over the private network 70 to one or more participating entities, including the mechanical crew 60 responsible for reviewing and handling detected anomalies in coupler securements. The anomaly notice 850, in some implementations, includes the raw field image 190 and one or more of the field conditions 740 including at least a location, a date and time, and a rail car identifier. The anomaly notice 850 may also include a view of the region of interest 192 which is a close-up view of the region where the coupler components are located. Upon receipt of the anomaly notice 850, the mechanical crew 60 may review the raw field image 190 and, based on the field conditions 740, dispatch a crew to meet the train at its next location in the rail network, where the crew can visually inspect the coupler and take action to correct the anomaly. The mechanical crew 60 may then report the corrective action to dispatchers or other concerned personnel. For example, the mechanical crew 60 may report the corrective action to those personnel in charge of the detection and notification system 310, confirming that the anomaly notice 850 was accurate. The confirmation may be recorded or stored in the record associated with that particular raw field image 190 in the master image database 200 for later use.

The mechanical crew 60, in some cases, may inspect the coupler for a reported anomaly and observe that, in fact, there is no anomaly. The cotter key is present. In such cases, the mechanical crew 60 may report the observation to certain personnel for potential action, including use of the erroneous anomaly notice 850 and the associated raw field image 190 when making improvements to the training system 210 and, in turn, improving the predictive model 1000.

In a related aspect, the raw field images 190 may be used by training system 210 on a periodic basis (e.g., quarterly) to generate additional training datasets and re-train the localization algorithm 460 and/or one or more of the classification models 560a, 560b, 560c. In this aspect, the predictive model 1000 is updated periodically based on real-world field images 190 captured at locations across the rail network.

Figure 9:
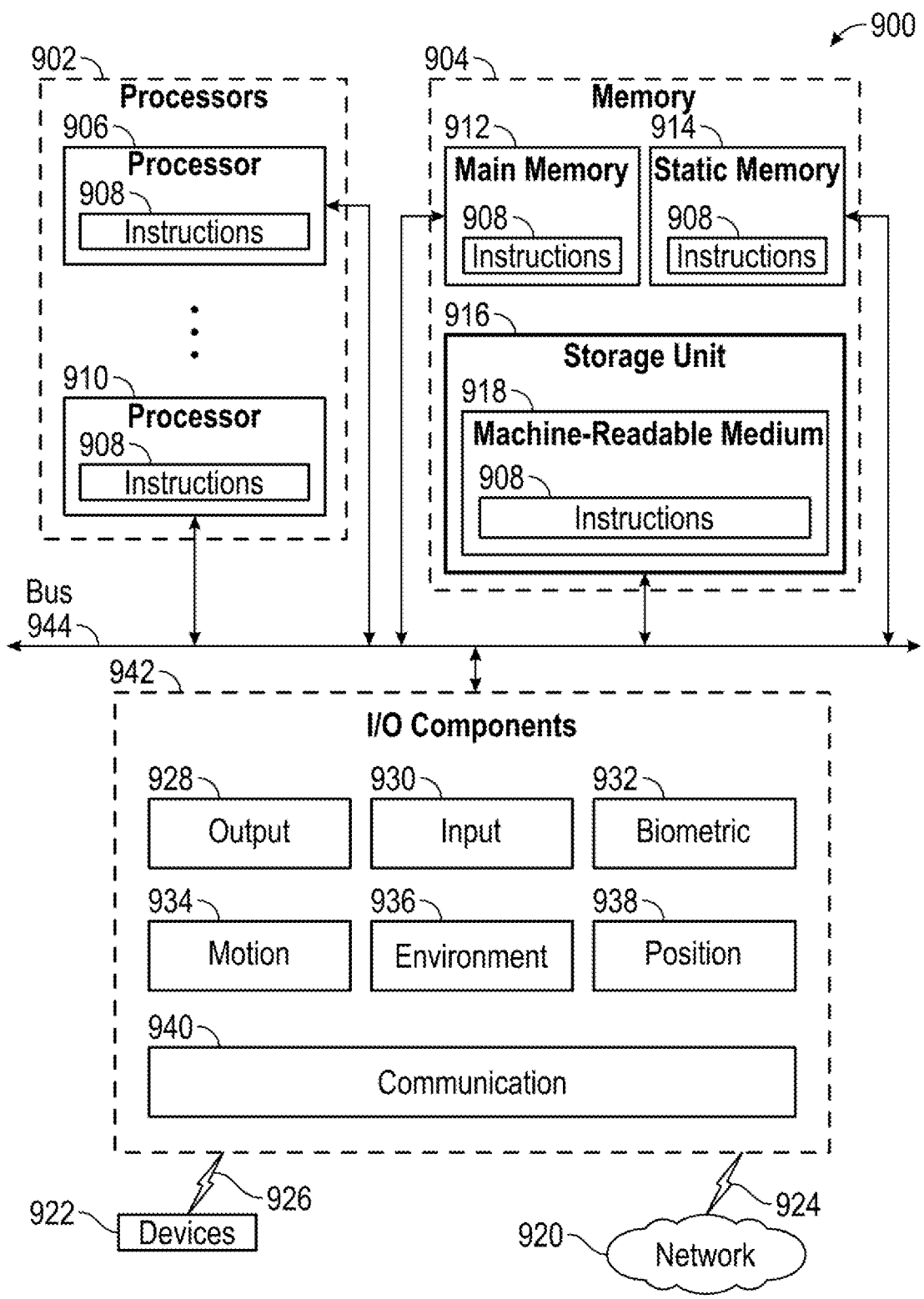
FIG. 9 is a diagrammatic representation of an example hardware configuration for a computing device such as a server.

FIG. 9 is a diagrammatic representation of an example hardware configuration for a computing machine 900. The machine 900, as shown, includes one or more processors 902, memory elements 904, and input-output components 942, all connected by a bus 944. The instructions 908 (e.g., software, a program, an application, an applet, an app, or other executable code) cause the machine 900 to perform any one or more of the methodologies described herein. For example, the instructions 908 may cause the machine 900 to execute any one or more of the methods and applications described herein. The instructions 908 transform the general, non-programmed machine 900 into a particular machine 900 that is programmed to carry out the described and illustrated functions in the manner described.

The machine 900 may operate as a standalone device or may be coupled (i.e., networked) to other machines. In a networked deployment, the machine 900 may operate in the capacity of a server machine or a client machine in a server-client network environment, or as a peer machine in a peer-to-peer (or distributed) network environment. In a networked and edge computing deployment, a number of machines 900 may be configured and located in the field, where each machine 900 operates as an edge server in the network. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and input/output (I/O) components 942, which may be configured to communicate with each other via a bus 944. In an example, the processors 902 (e.g., a Central Processing Unit (CPU), a Graphics Processing Unit (GPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 5 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 5. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, a resistance feedback mechanism), other signal generators, and so forth. The input components 930 may include alphanumeric input components (e.g., a keyboard, a touch screen configured to receive alphanumeric input, a photo-optical keyboard, or other alphanumeric input components), pointing-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or to other devices 922. For example, the communication components 940 may include a network interface component 924 or another suitable device to interface with a network 920 (e.g., a wide-area network (WAN) or a public network such as the internet). Another type of interface 926 may be used to interface with other devices 922, which may be another machine or any of a wide variety of peripheral devices (e.g., a peripheral device coupled via a USB). In further examples, the communication components 940 may include wired communication components, wireless communication components, cellular communication components, Near-field Communication (NFC) components, Bluetooth® components (e.g., Bluetooth® Low Energy), Wi-Fi® components, and other components to provide communication via other modalities.

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 10:
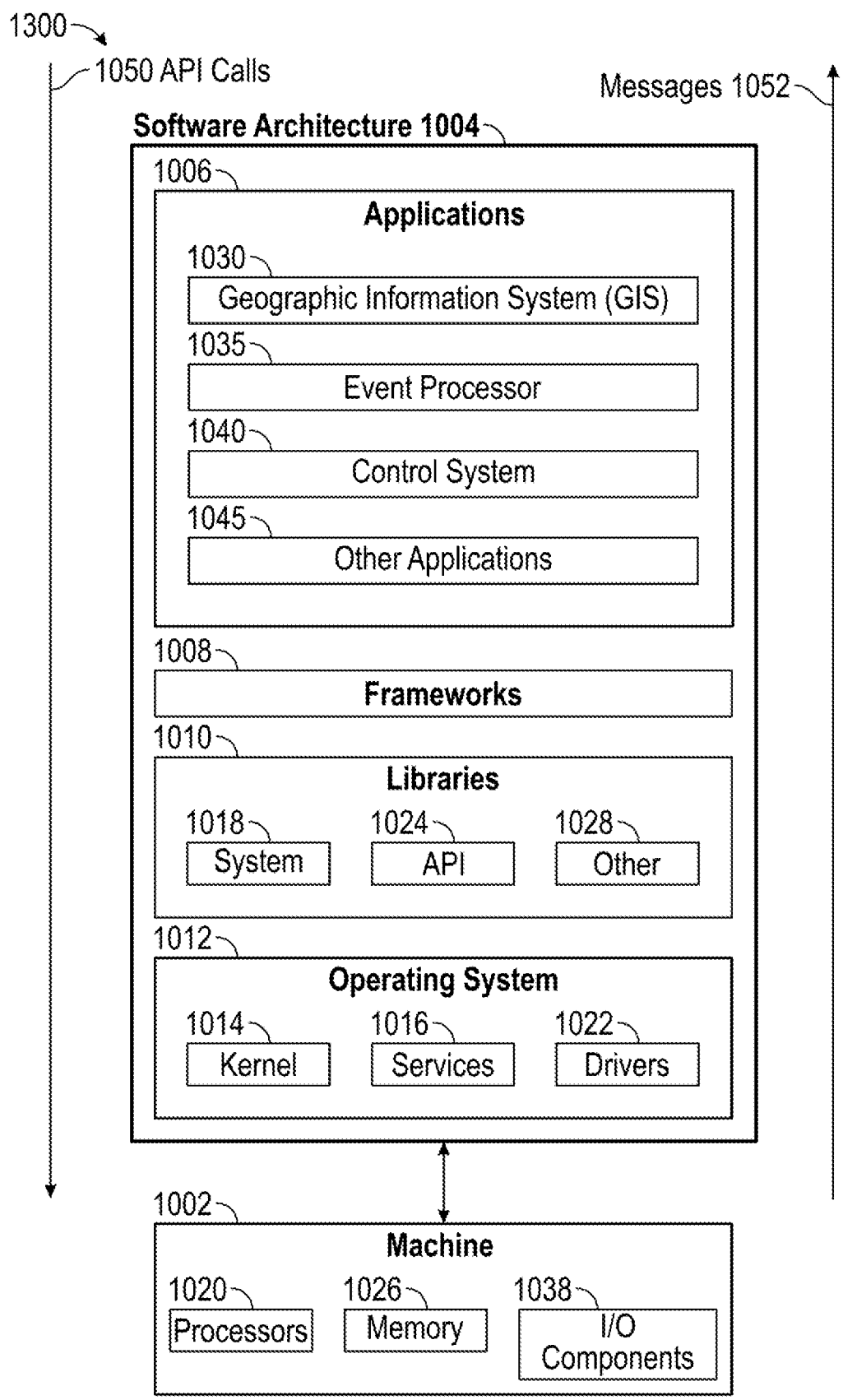
FIG. 10 is block diagram of an example software architecture suitable for use with the systems and methods described herein, in accordance with examples.

FIG. 10 is block diagram 1300 illustrating an example software architecture 1004. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as applications 1006, frameworks 1008, libraries 1010, and an operating system 1012.

Operationally, the applications 1006 invoke API calls 1050 through the software stack and receive messages 1052 in response to the API calls 1050. An application programming interface (API) in some instances is a software-based intermediary that allows devices or applications to communicate with others. Different APIs can be designed and built for specific purposes. An API Call 1050 is a query or request for information. For example, a mobile device may execute and send an API Call 1050 to a particular application on the mobile device, which processes the query and returns a result (referred to as an API Message 1052). In another example, a server may send an API Call 1050 requesting the configuration attributes associated with a particular application to a remote mobile device, which processes the query and returns a result including the attributes to the server. The term API is also used sometimes to describe discrete functions or features associated with an application.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, Bluetooth® or Bluetooth® Low Energy (BLE) drivers, flash memory drivers, serial communication drivers (e.g., Universal Serial Bus (USB) drivers), Wi-Fi® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQL or SQLite to provide various relational database functions), web libraries (e.g., a WebKit® engine to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 include a geographic information system 1030, an event processor 1035, a control system 1040, and other applications 1045. Various programming languages can be employed to create one or more of the applications 1006, structured in a variety of manners, such as object-oriented programming languages (e.g., Objective-C, Java, or C++) or procedural programming languages (e.g., C or assembly language).

Any of the functionality described herein for the wearable or eyewear device 100, the client device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of generating a predictive model, comprising:
    identifying, for each raw image of a plurality of raw images, one or more conditions observable in the raw image of a plurality of raw images, wherein the one or more conditions originate from the plurality of raw images;
    storing, in a master image database, the plurality of raw images together with the one or more conditions associated with each of said plurality of raw images;
    generating a plurality of secondary images, each secondary image of the plurality of secondary images being associated with a particular raw image of the plurality of raw images and being based on the one or more conditions identified from a corresponding raw image of said plurality of raw images, wherein said plurality of secondary images comprises one or more adjusted images and one or more augmented images;
    storing said plurality of secondary images in said master image database;
    curating a plurality of training datasets comprising raw images and secondary images selected from said master image database;
    training a classification algorithm with said plurality of training datasets, wherein said classification algorithm comprises an ensemble of classification models, and wherein each classification model is trained with a different training dataset; and
    storing said trained classification algorithm in an algorithm repository.

2. The method of claim 1, wherein said one or more conditions comprises subject conditions, geospatial site conditions, or environmental conditions.

3. The method of claim 2, wherein said one or more conditions further comprises:
    the subject conditions consisting of at least one of a coupler type condition and a cotter key presence condition;
    the geospatial site conditions consisting of at least one of a location condition, a date condition, and a time condition; or
    the environmental conditions consisting of at least one of a weather condition and an ambient light condition.

4. The method of claim 1, further comprising:
    curating a selected training dataset comprising raw images and secondary images selected from said master image database;
    training a localization algorithm with a selected training dataset, wherein said localization algorithm produces one or more regions of interest associated with each of said selected images; and
    storing said one or more regions of interest in said master image database.

5. The method of claim 4, wherein said step of training a localization algorithm comprises:
    evaluating said produced one or more regions of interest, using a validation training set, to determine a localization confidence value; and
    terminating said training when said localization confidence value exceeds a predetermined threshold localization value.

6. The method of claim 4, wherein said step of training a classification algorithm further comprises:
    curating a first training dataset comprising raw images and secondary images selected from said master image database;
    retrieving a first region of interest selected from said stored one or more regions of interest, wherein said first region of interest is associated with a first raw image in said first training dataset;
    generating a plurality of first candidate regions associated with said first region of interest;
    training a first classification model selected from said ensemble with said plurality of first candidate regions to produce a first result;
    generating a first model score based on said produced first result;
    evaluating said produced first result, using a first validation set selected from said first training dataset, to determine a first classification confidence value; and
    terminating said training when said first classification confidence value exceeds a predetermined threshold classification confidence value.

7. The method of claim 1, further comprising:
    receiving a raw field image and one or more field conditions associated with said raw field image;
    executing said trained classification algorithm to generate a composite field score;
    determining whether said composite field score indicates an anomaly associated with said raw field image; and
    in response to determining that said composite field score indicates an anomaly, assembling and broadcasting an anomaly notice comprising at least said raw field image and one or more of said field conditions.

8. The method of claim 7, wherein said composite field score comprises a binary condition, present or absent, associated with a single object detectable in said raw field image by said trained classification algorithm.

9. The method of claim 1, wherein the augmented images further comprise augmenting at least one or more of the plurality of raw images to simulate the one or more conditions by applying at least one of a degree of blurring, a randomized blurring, a region-based dynamic brightening, and a randomized brightening.

10. The method of claim 1, wherein the duplicate images further comprise duplicating at least one or more of the plurality of raw images to increase a number of the plurality of second images including the one or more conditions.

11. A system for training a predictive model, comprising:
    a server comprising a processor and a memory coupled to at least a master image database, a training dataset repository, and an algorithm repository; and
    programming in said memory, wherein execution of said programming by said processor configures said server to perform functions, including functions to:
        identify, for each raw image of a plurality of raw images, one or more conditions observable in the raw image of a plurality of raw images, wherein the one or more conditions originate from the plurality of raw images;

store, in said master image database, the plurality of raw images together with the one or more conditions associated with each of said plurality of raw images;

generate a plurality of secondary images, each secondary image of the plurality of secondary images being associated with a particular raw image of the plurality of raw images and being based on the one or more conditions associated with a corresponding raw image of said plurality of raw images, wherein said plurality of secondary images comprises one or more adjusted images and one or more augmented images;

store said plurality of secondary images in said master image database;

curate a plurality of training datasets comprising raw images and secondary images selected from said master image database;

train a classification algorithm with said plurality of training datasets, wherein said classification algorithm comprises an ensemble of classification models, and wherein each classification model is trained with a different training dataset; and store said trained classification algorithm in an algorithm repository.

12. The system of claim 11, wherein said execution configures said server to perform additional functions, including functions to:

curate a selected training dataset comprising raw images and secondary images selected from said master image database;

train a localization algorithm with a selected training dataset, wherein said localization algorithm produces one or more regions of interest associated with each of said selected images; and store said one or more regions of interest in said master image database.

13. The system of claim 12, wherein said execution configures said server to perform additional functions, including functions to:

curate a first training dataset comprising raw images and secondary images selected from said master image database;

retrieve a first region of interest selected from said stored one or more regions of interest, wherein said first region of interest is associated with a first raw image in said first training dataset;

generate a plurality of first candidate regions associated with said first region of interest;

train a first classification model selected from said ensemble with said plurality of first candidate regions to produce a first result;

generate a first model score based on said produced first result;

evaluate said produced first result, using a first validation set selected from said first training dataset, to determine a first classification confidence value; and terminate said training when said first classification confidence value exceeds a predetermined threshold classification confidence value.

14. The system of claim 12, wherein said execution configures said server to perform additional functions, including functions to:

receive a raw field image and one or more field conditions associated with said raw field image;

execute said trained classification algorithm to generate a composite field score;

determine whether said composite field score indicates an anomaly associated with said raw field image; and in response to determining that said composite field score indicates an anomaly, assemble and broadcast an anomaly notice comprising at least said raw field image and one or more of said field conditions.

15. A non-transitory processor-readable storage medium that stores processor-executable instructions that, when executed by a processor of a machine, cause said machine to perform operations comprising:

identifying, for each raw image of a plurality of raw images, one or more conditions observable in the raw image of a plurality of raw images, wherein the one or more conditions originate from the plurality of raw images;

storing, in a master image database, the plurality of raw images together with the one or more conditions associated with each of said plurality of raw images;

generating a plurality of secondary images, each secondary image of the plurality of secondary images being associated with a particular raw image of the plurality of raw images and being based on the one or more conditions identified from a corresponding raw image of said plurality of raw images, wherein said plurality of secondary images comprises one or more adjusted images and one or more augmented images;

storing said plurality of secondary images in said master image database;

curating a plurality of training datasets comprising raw images and secondary images selected from said master image database;

training a classification algorithm with said plurality of training datasets, wherein said classification algorithm comprises an ensemble of classification models, and wherein each classification model is trained with a different training dataset; and storing said trained classification algorithm in an algorithm repository.

16. The non-transitory processor-readable storage medium of claim 15, wherein said instructions cause said machine to perform additional operations, comprising:

curating a selected training dataset comprising raw images and secondary images selected from said master image database;

training a localization algorithm with a selected training dataset, wherein said localization algorithm produces one or more regions of interest associated with each of said selected images; and storing said one or more regions of interest in said master image database.

17. The non-transitory processor-readable storage medium of claim 16, wherein said instructions cause said machine to perform additional operations, comprising:

curating a first training dataset comprising raw images and secondary images selected from said master image database;

retrieving a first region of interest selected from said stored one or more regions of interest, wherein said first region of interest is associated with a first raw image in said first training dataset;

generating a plurality of first candidate regions associated with said first region of interest;

training a first classification model selected from said ensemble with said plurality of first candidate regions to produce a first result;

generating a first model score based on said produced first result;

evaluating said produced first result, using a first validation set selected from said first training dataset, to determine a first classification confidence value; and terminating said training when said first classification confidence value exceeds a predetermined threshold classification confidence value.

18. The non-transitory processor-readable storage medium of claim 16, wherein said instructions cause said machine to perform additional operations, comprising:

receiving a raw field image and one or more field conditions associated with said raw field image;

executing said trained classification algorithm to generate a composite field score;

determining whether said composite field score indicates an anomaly associated with said raw field image; and in response to determining that said composite field score indicates an anomaly, assembling and broadcasting an anomaly notice comprising at least said raw field image and one or more of said field conditions.

* * * * *